United States Patent [19]

Dalebout

[11] Patent Number: 5,247,853
[45] Date of Patent: Sep. 28, 1993

[54] FLYWHEEL

[75] Inventor: William T. Dalebout, Logan, Utah

[73] Assignee: Proform Fitness Products, Inc., Logan, Utah

[21] Appl. No.: 839,204

[22] Filed: Feb. 20, 1992

Related U.S. Application Data

[63] Continuation of Ser. No. 481,353, Feb. 16, 1990, abandoned.

[51] Int. Cl.⁵ .............................. G05G 1/00
[52] U.S. Cl. .................... 74/572; 74/573 R; 74/574; 482/63; 482/64
[58] Field of Search .............. 74/572, 573 R, 574; 482/62, 63, 64, 59; 280/217; D21/194

[56] References Cited

U.S. PATENT DOCUMENTS

| | | | |
|---|---|---|---|
| D. 254,679 | 4/1980 | Gustafsson | D21/194 |
| D. 275,589 | 9/1984 | Gustafsson | D21/194 |
| D. 280,003 | 8/1985 | Kiiski | D21/194 |
| D. 280,923 | 10/1985 | Smith et al. | D21/194 |
| D. 281,520 | 11/1985 | Kiiski | D21/194 |
| D. 282,190 | 1/1985 | Bell et al. | D21/194 |
| D. 286,665 | 11/1986 | Kelly | D21/194 |
| 3,008,265 | 11/1961 | Converse | 272/73 |
| 3,100,640 | 8/1963 | Weitzel | 272/73 |
| 3,190,675 | 6/1965 | Tang | 272/73 |
| 3,227,447 | 1/1966 | Baker et al. | 272/73 |
| 3,967,503 | 7/1976 | Svensson | 272/73 X |
| 4,007,927 | 2/1977 | Proctor | 482/63 |
| 4,138,286 | 2/1979 | Chevrolat et al. | 74/574 |
| 4,148,478 | 4/1979 | Moyski et al. | 272/73 |
| 4,208,921 | 6/1980 | Keyes | 74/572 |
| 4,286,696 | 9/1981 | Szymski et al. | 482/63 |
| 4,291,872 | 9/1981 | Brilando et al. | 482/63 |
| 4,505,473 | 3/1985 | Pro | 272/73 |
| 4,533,136 | 8/1985 | Smith et al. | 482/63 |
| 4,589,656 | 5/1986 | Baldwin | 482/63 |
| 4,602,781 | 7/1986 | La Marsh et al. | 272/73 |
| 4,611,807 | 9/1986 | Castillo | 272/73 X |
| 4,645,199 | 2/1987 | Bloemendaal | 272/73 |
| 4,746,112 | 5/1988 | Fayal | 482/63 |
| 4,762,317 | 8/1988 | Camfield et al. | 272/73 |
| 4,786,069 | 11/1988 | Tang | 272/73 |
| 4,917,377 | 4/1990 | Chen | 482/64 |
| 4,938,474 | 7/1990 | Sweeney et al. | 482/64 X |
| 4,977,794 | 12/1990 | Metcalf | 74/572 |
| 4,981,294 | 1/1991 | Dalebout et al. | 482/63 X |

FOREIGN PATENT DOCUMENTS

| | | | |
|---|---|---|---|
| 3106448 | 12/1981 | Fed. Rep. of Germany | 272/73 |
| 1107793 | 1/1956 | France | 272/73 |
| 475207 | 11/1937 | United Kingdom | 272/73 |

OTHER PUBLICATIONS

Baumeister, et al, Marks' Standard Handbook for Mechanical Engineers, Eighth Edition, McGraw-Hill Book Company, 1978, pp. 9–170 & 6-140-6-148.

Primary Examiner—Vinh T. Luong
Attorney, Agent, or Firm—Trask, Britt & Rossa

[57] ABSTRACT

A flywheel for a stationary exercise machine having a frictional resistance strap is formed of heat-sensitive plastic, and includes a band of heat-dissipating material disposed about the periphery or rim of the flywheel for frictional contact with the resistance strap. The strap extends around the flywheel rim over the band to provide an adjustable resistance to the flywheel's rotation. The band dissipates the frictionally generated heat arising from movement of the flywheel within the strap.

24 Claims, 6 Drawing Sheets

5,247,853

FLYWHEEL

This is a continuation of application Ser. No. 07/481,353, filed Feb. 16, 1990, abandoned.

BACKGROUND OF THE INVENTION

1. Field

This invention relates to flywheels. More particularly, the invention is related to rotatable flywheels used on stationary exercise cycles and the like in which the flywheel perimeter surface is in frictional contact with a stationary strap.

2. Description of the Prior Art

Exercise cycles using a flywheel which rotates against a stationary resistance strap are well known. The total force required to attain and maintain a particular rotational speed is dependent upon the inertia of the flywheel as well as the friction imposed on the flywheel by the strap.

Exercise machines such as stationary cycles which employ inertia flywheels are known to use metal as the material of construction for the flywheel. With typical metal flywheels, the heat produced by friction imposed by the strap is readily dissipated. However, metal flywheels are typically heavy, thereby increasing packaging and shipping costs. Further, exercise machines with metal flywheels may be difficult to move or reposition for use for some users, particularly older or infirm users. Further, metal flywheels are typically cast and may require balancing, machining, painting or other processing in the course of manufacture and therefore may be relatively expensive.

SUMMARY OF THE INVENTION

A flywheel may be constructed of non-metallic plastic-like material such as acrylonitrile-Butadiene-Styrene (ABS), styrene, polypropylene, nylon, and the like. The main portion of the flywheel may be easily formed by molding in a single piece, or in two identical or nearly identical sections.

The flywheel may be formed to accommodate an axle and means for rotating the flywheel by belt, chain, gear or direct-drive.

A band of heat dissipating material circumscribes the flywheel over a portion of its circumference for contact with a stationary resistance strap. Preferably the band is made of a metal such as steel, but it may also be made of an engineered thermoplastic which is heat resistant. The band may be attached and/or held in place by several alternative methods, including the use of adhesives. Use of the band prevents melting of the plastic-like wheel where it is in frictional movement against the stationary resistance strap.

The inertia of the flywheel is controlled by varying the material of the band and its cross-sectional dimensions, as well as by the use of weights near the outer periphery of the wheel. In one embodiment, sand may be used as the weight.

BRIEF DESCRIPTION OF THE DRAWINGS

In the drawings, which illustrate what is regarded as the best mode for carrying out the invention.

DESCRIPTION OF THE PREFERRED EMBODIMENT

Figure 1:
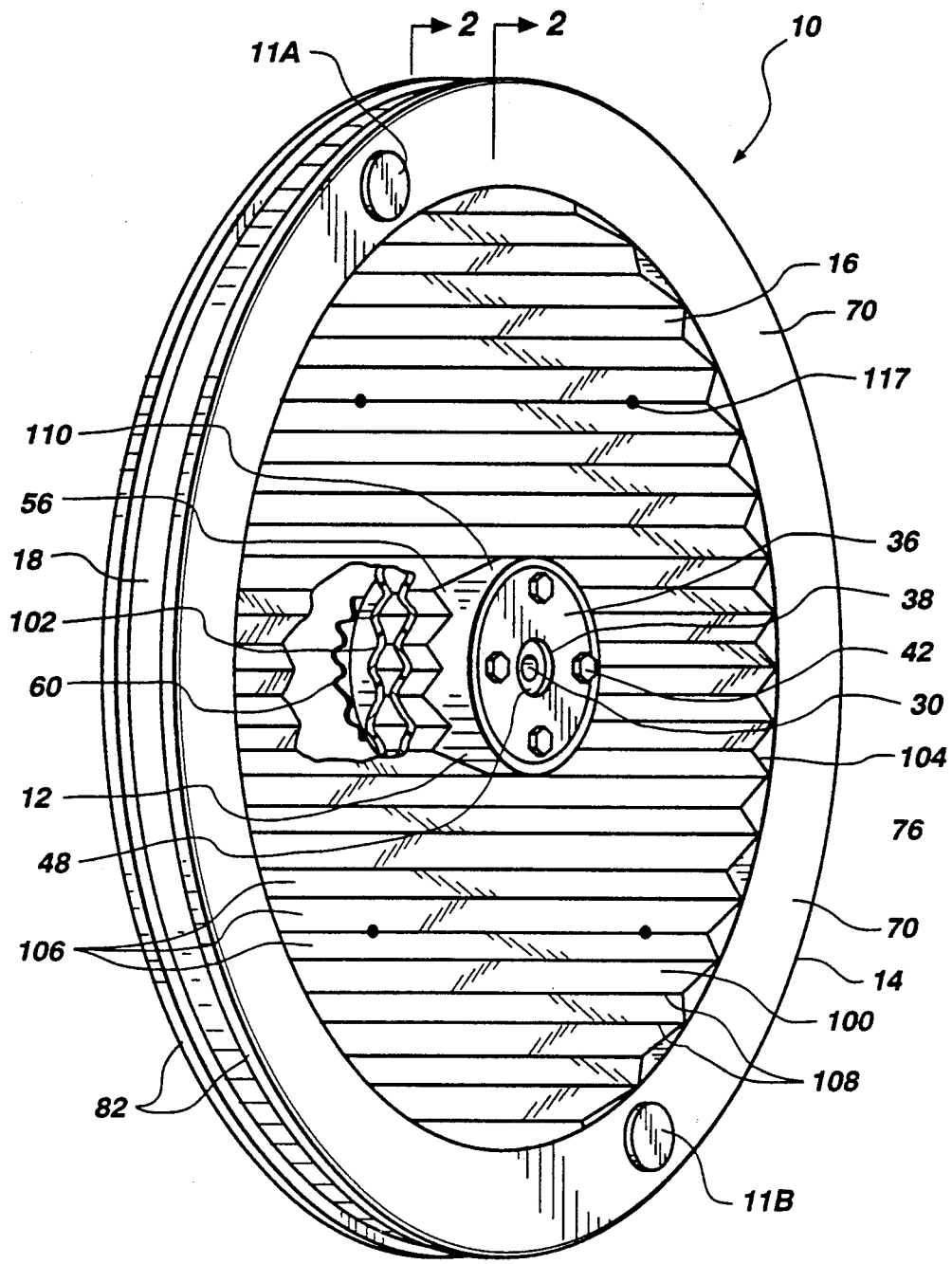
FIG. 1 is a turned, partially cutaway side view of a flywheel of the present invention.
Figure 2:
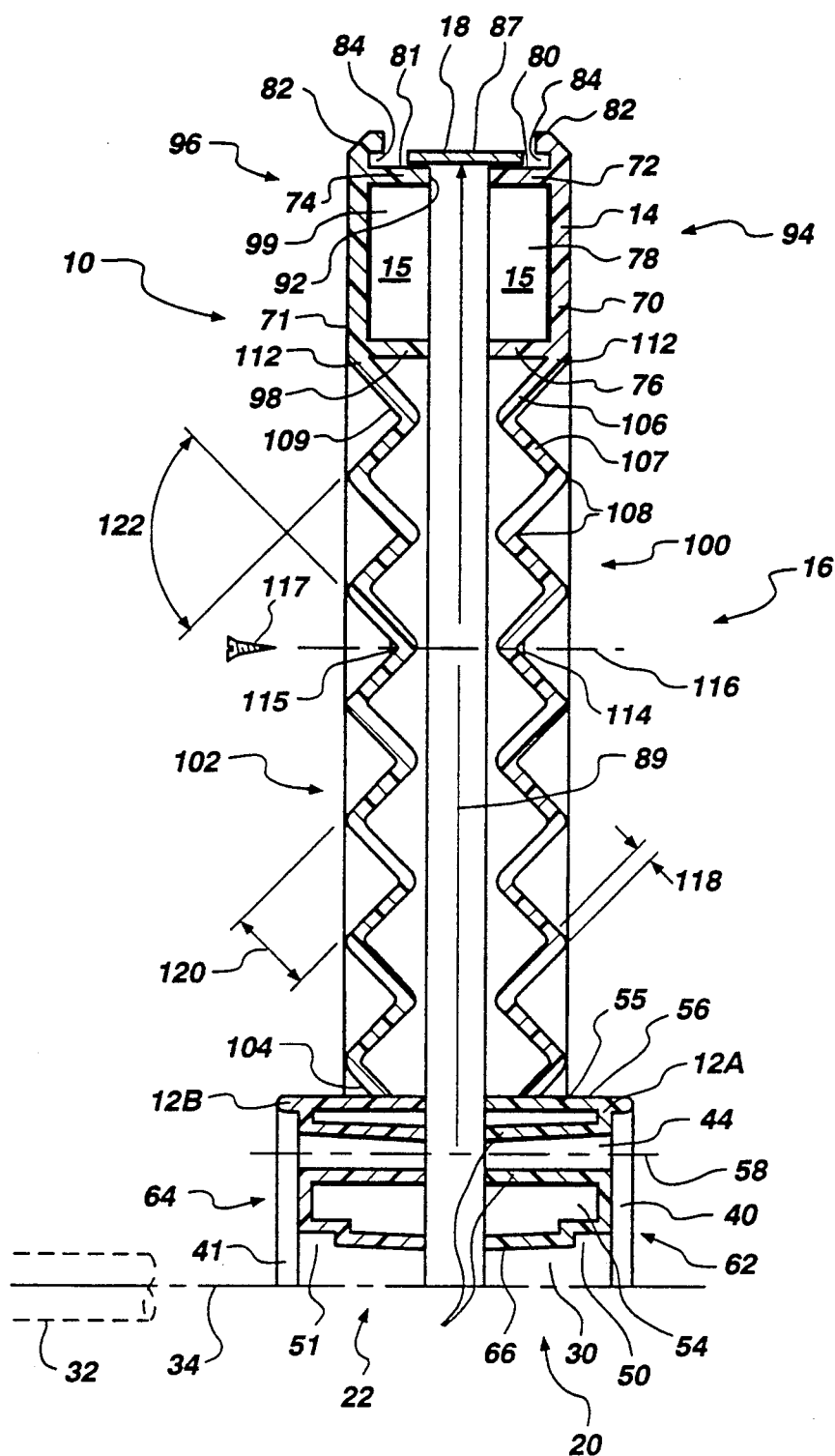
FIG. 2 is a cross-sectional exploded end view along lines 2—2 of FIG. 1.

As illustrated in FIG. 1, flywheel 10 includes a central hub 12, annular rim 14, an intermediate structure 16 joined to the outer periphery 56 of hub 12 along juncture 110 and to rim 14 along juncture 104, and a band 18 circumferentially attached to the flywheel body and held along each edge by opposing band retention means which are opposite lips 82 and 83 better shown in FIG. 2.

Hub 12 is shown as including on one side, a hub plate 36 which overlies bearing 48 with axle-way 30. In the cutaway section, the opposite side of hub 12 is shown to include a sprocket wheel 60 for turning the flywheel with a chain interconnected to a large sprocket operated by pedals. Alternatively, other means may be used for driving the flywheel including gears, a pulley system, or even directly by pedals attached to a shaft extending through the axle-way 30.

An axle 32, is shown in phantom in FIG. 2. It passes through a central hole 38 in hub plate 36 as well as the hub plate not shown on the side with sprocket 60 in FIG. 1. Hub plate 36 is joined to its opposing plate (not shown) by bolts 42 or other means which pass from one end to the other end of hub means 12.

The rim 14 has opposing lateral sides 70 and 71 separated by circular ribs 76 and 98 adjacent the intermediate structure 16, to which it is joined. The ribs 76 and 98 together with band support members 72 and 74 define the spaces or voids 78 and 99. In the embodiment of FIGS. 1 and 2, plugs 11A and 11B may be formed in the lateral sides 70 and 71 in order to access the spaces 78 and 99 with the flywheel 10 assembled as shown in FIG. 1. With the plugs 11A and 11B removed, a weight material such as sand, metal beads, or the like, generally designated in FIG. 2 by reference numeral 15, may be readily inserted either before shipment or preferably after to weight the wheel to attain a desired inertia in use.

Figure 8:
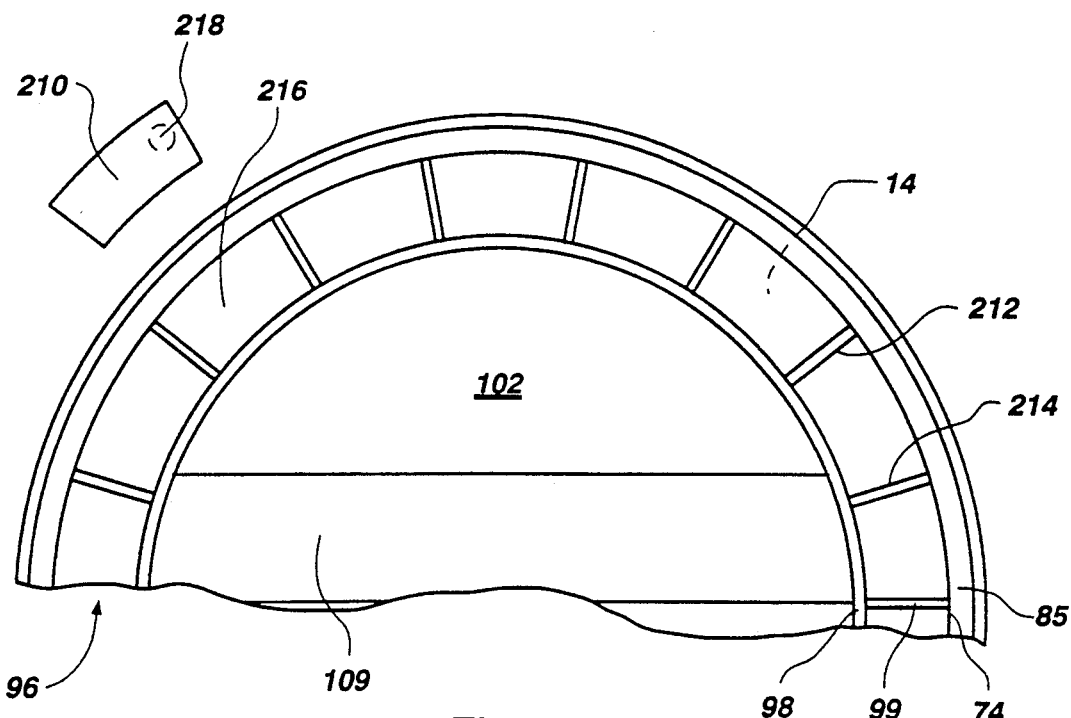
FIG. 8 is a partial side view of a portion of a modified flywheel of FIG. 2.

Alternately, weights 210 may be preformed to fit into the voids 78 and 99 snugly one next to the other about the rim 14. They may also be placed in a spaced apart pattern. In FIG. 8, radial members such as members 212 and 214 are formed in the rim structure 96 to form a plurality of radial compartments such as compartment 216 to receive a weight such as weight 210. Notably, the weight 210 is formed to substantially fill the spaces or voids 78 and 99. The weight 210 may be a metal ingot or a plastic container with an aperture to receive sand, metal beads or the like as a weight material.

As shown in FIG. 2, the flywheel 10 of this embodiment of the invention has halves 20 and 22 each with a side wall 100 and 102. The side walls 100 and 102 may be of various configurations provided that the resulting flywheel has both rigidity and strength to accommodate the rotational, axial and radial forces exerted on the flywheel 10. The sidewalls 100 and 102 are here shown as being unidirectionally corrugated. In this configuration, the support structure between the hub 12 and the rim 14 is alternating corrugation members 106 which meet along joints 108. Preferably, the two side walls 100, 102 have the corrugation joints 108 oriented in the same direction. However, they may be oriented in any desired alignment with respect to each other. The support structure may be any other acceptable structure in any desired aesthetic configuration in lieu of the corrugation illustrated to fixedly hold the rim 14 relative to the hub. Various forms of spokes may also be used.

In FIG. 2, flywheel 10 is shown to have two opposing halves 20 and 22 which are spaced apart or separated for clarity of illustration. It is also understood that the flywheel structure is shown only on one side of the axis-of-rotation 34. The structure on the other side not shown is a mirror image.

The two halves or sides 20, 22 each have hub structures 62 and 64 which together comprise hub 12. Side walls 100 and 102 together comprise intermediate structure 16. Rim structures 94 and 96 together comprise rim 14.

Hub structures 62 and 64 have a central axle-way defined by wall 66 formed about the axis of rotation 34. An axle 32 partially shown in phantom, passes through axle-way 30 and is supported on one side by bearing 48, shown in FIG. 1 and by a similar bearing not shown on the other side. The bearings are mounted in bearing recesses 50 and 51 and are held therein on one side by hub plate 36 mounted in hub plate recess 40 and on the other side by a hub plate (not shown) in hub plate recess 41.

Bolt channels 44 defined by bolt guide walls 46 permit passage of bolts or screws 42 therethrough along axis 58 to clamp the two sides 20,22 together. The spaces 54 and 55 surrounding the bolt guide wall 46 and wall 66 are formed to reduce the amount of material used and form a lighter weight hub 12 which is nevertheless of sufficient strength to support the rim 14 at high rotative speeds and high torque loads.

Rim structures 94 and 96 have side members 70 and 71, with band support members 72 and 74 having band support surfaces 80 and 81. Ribs 76 and 98 also extend from the sides 70 and 71 to form void spaces 78 and 99. The band support members 72 and 74 abut each other in a butt joint 92 which form a flat support surface comprised of surfaces 80 and 81 for band 18. Ribs 76 and 98 also abut each other.

Figure 3:
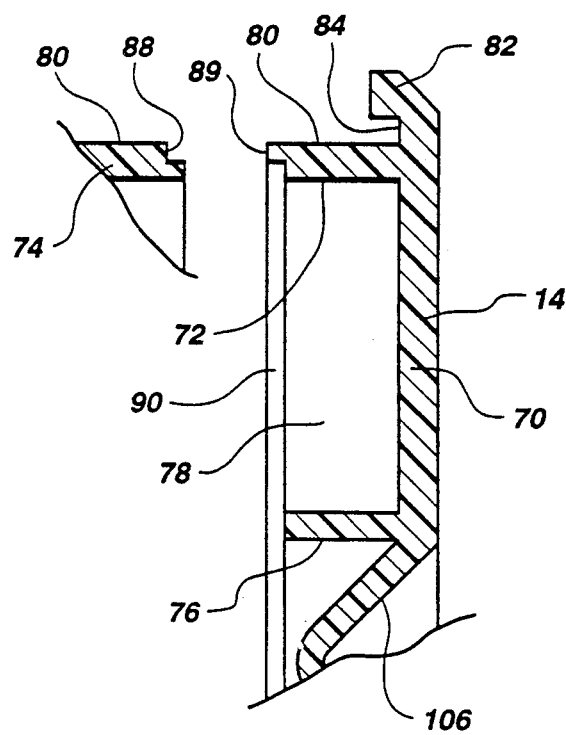
FIG. 3 is an enlarged exploded cross-sectional view of a rim portion of a flywheel of this invention.

In an alternate arrangement, the opposing inner edges 88 and 89 of support members 72 and 74 are each rabbeted circumferentially to interlock together as shown in FIG. 3. Other means to interlock or attach the support members 72 and 74 may be used. Interlocking or attaching provides for a more stable assembly between halves 20 and 22 when assembled. The inner edges 88 and 89 may also be glued if desired.

In FIGS. 2 and 3, band retention means 82 and 83 are shown with inside slots 84 and. When the two sides 20,22 are joined, band 18 fits into opposing slots 84 and 85 and is held therein. The band 86 may be made of any suitable heat dissipating material including metals such as aluminum, iron alloys or the like, as well as selected compositions of heat resistant plastic-type material such as ULTEM TM synthetic made by General Electric Corporation, or Bakelite synthetic resin or the like. The exterior surface 87 of the band 18 is smooth to avoid wearing the friction strap to be placed thereabout. The band 18 may be dimensioned to have sufficient mass to provide desired weight and inertia.

The inertia for a ring such as the band 18 is directly proportional to the mass and to the square of the radius 89. Thus, the inertia of flywheel 10 is enhanced by providing the mass of the flywheel 10 at its rim 14. If additional mass is desired, weight material may be placed as noted hereinbefore in space 78 and 99 between support members 72 and 74 and the ribs 76 and 98 to increase the inertia.

As depicted in FIG. 2, each side wall 100, 102 is unidirectionally corrugated. Alternating corrugation members 106 are moldedly joined to each other along corner joints 108. These members, such as 106, 107 and 109 are molded to have thickness 118, width 120 and a corner joint angle 122. The angle 122 is generally about 90 degrees. Preferably, the dimensions or the members 106 and 107 are selected so that when the two sides 20,22 are joined, opposing side wall 100 is slightly spaced from side wall 102. The sidewalls 100 and 102 may be fixedly joined to each other by screws 117 along axis 116 in corners 114 and 115. Typically, 4 to 8 radially spaced screws 117 are used.

Side 20 is formed in one piece with hub structure 12A, sidewall 100 and rim structure 94. The other side 22 is formed in one piece with hub structure 12B, sidewall 102 and rim structure 96. Each piece may be made by molding it out of a semi-rigid or rigid plastic. Multiple molds may be avoided by using the same configuration for each side 20,22. As already discussed, some differences may be desirable, depending on the particular application.

Figure 4:
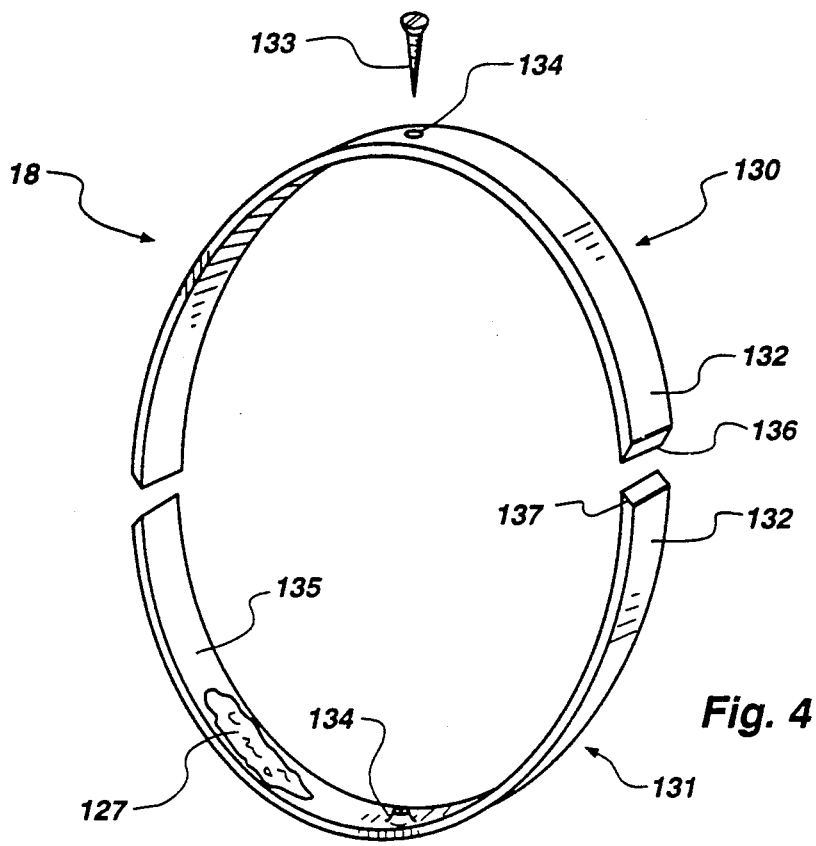
FIG. 4 is a perspective view of a two piece band in accordance with this invention.
Figure 5:
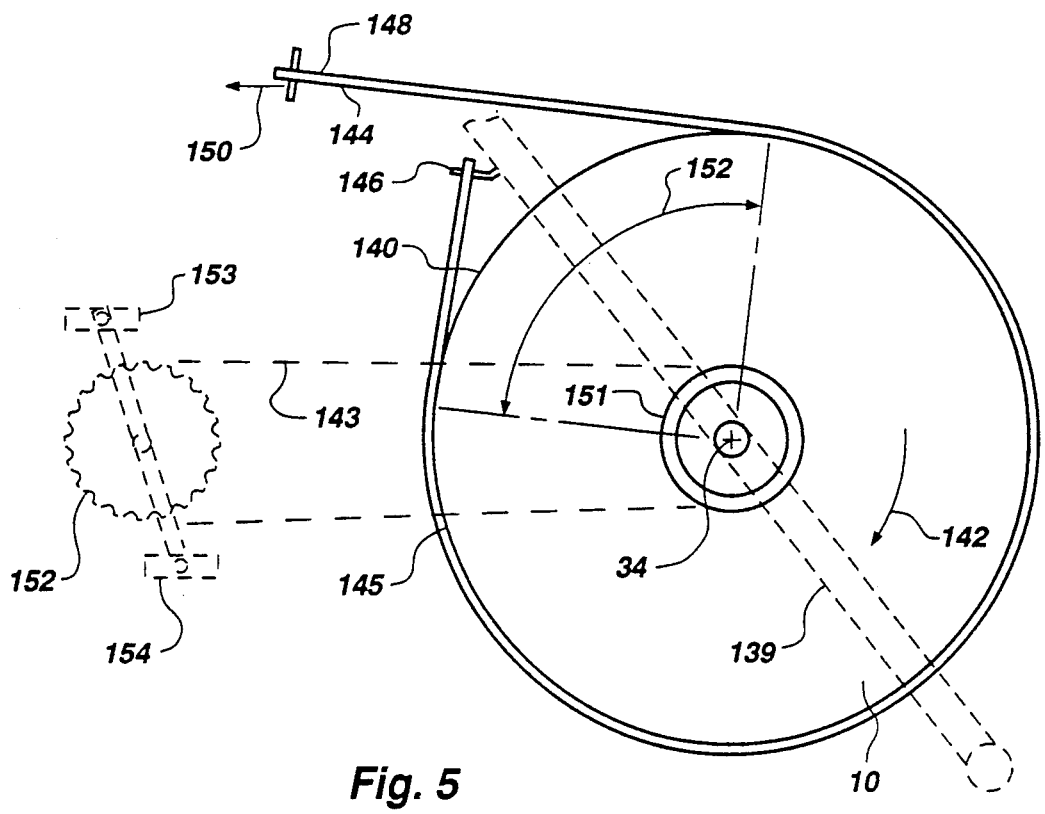
FIG. 5 is a schematic side view of a flywheel and a resistance strap with a portion of a cycle exerciser.

FIG. 4 depicts the construction of one configuration of a band 18 which has two sections 130 and 131. Each section 130 and 131 is firmly fixed to band support surface 80 and 81 (FIG. 2) by one or more flathead screws 133 positioned through aperture 134 which is countersunk to avoid contact of the screwhead with a friction strap such as strap 144 (FIG. 5). Alternately, a rivet may be used. The band 18 is made of metal or a high density plastic-like material which readily conducts heat. An adhesive 127 may also be applied to the inside 135 together with screws and rivets or in lieu of them for securing the band 18 to the rim structure of a flywheel. Each end 136 and 137 of adjacent sections 130 are chamfered, rounded or similarly formed to minimize wear on the friction strap. The band 131 may be formed in more than two sections. Multiple sections are desirable to facilitate assembly and reduce costs in manufacture. That is, the same mold may be used for each section 130 and 131. Further, semi-circular sections 130 and 131 are easier and cheaper to store and ship than circular sections.

FIG. 5 depicts an exercise cycle flywheel 10 in frictional contact with resistance strap 144 fixedly mounted at a fixed end 146 and movably mounted through a bracket at its opposite end 148 for adjusting the tension force, thereby changing the force required to turn the flywheel 10 in direction 142 about axis 34. The angular section 152 in which the strap 144 is not in contact with the rim 140 is typically less than 90 degrees. That is, the strap 144 is preferably in contact with the rim about as much of the perimeter 145 as reasonable for the particular configuration of the cycle frame 139.

In FIG. 5, the resistance system shown is for a stationary exercise cycle. A chain 143 is depicted in phantom for further connection from the sprocket 151 (similar to sprocket 60 (FIG. 1) which is not here shown in detail to a drive sprocket 152 positioned for rotation with pedals 153 and 154 operated by a user on the cycle. A frame structure 139 of the stationary exercise cycle is also shown in phantom to which the fixed end 146 is secured.

Figure 6:
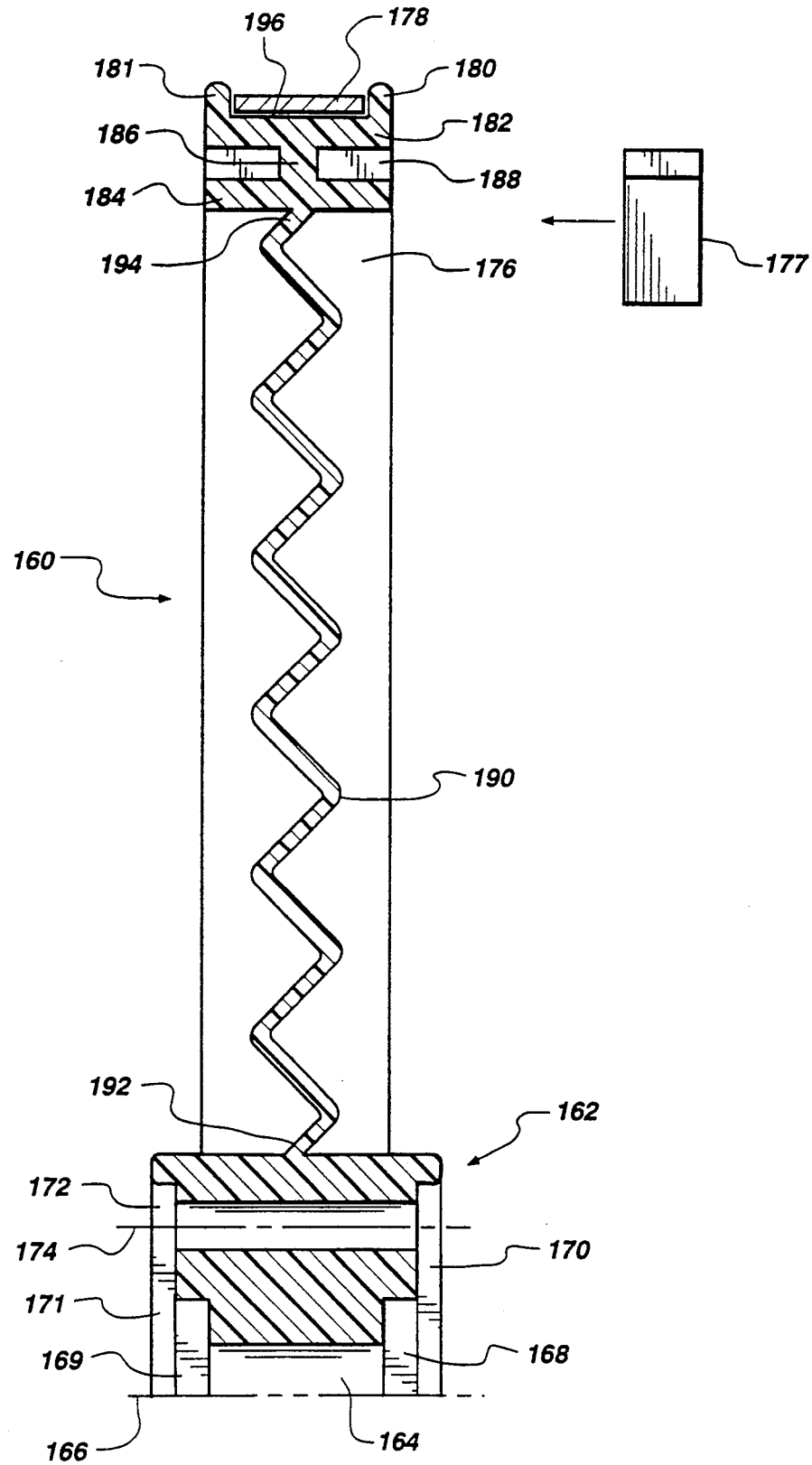
FIG. 6 is a cross-section view of one-half of another embodiment of the flywheel according to this invention.

FIG. 6 depicts another embodiment of the present invention in which the flywheel 160 is a single molded unit. One piece hub 162 has a centrally located axle-way 164 about the axis of rotation 166. Bearing recesses 168, and 169 and hub plate recesses 170 and 171 are provided on each face of the hub 162. Three or more bolt holes 172 are spaced about the axle-way 164 through which bolts are placed along axis 174 to hold opposing hub plates in place.

Rim 176 is a single annular member with outer structure 182 and inner structure 184 joined by circumferential strut 186. Slots 188 may be continuous about the full circle of the rim, on both sides of rim, or may be discontinuous. Metal or other material may be formed into an annular ring or segments 177 of a ring to fit within slots 188 for increasing mass and in turn the wheel inertia without significantly increasing the weight of the wheel 160. That is, the inertia may be enhanced without significantly increasing the weight of the wheel. Similarly, weights may be bolted to the rim 176 or even to the support structure such as the wall member 190 near or proximate to the rim 176.

Band retaining means 180 and 181 retain band 178 axially on the bed 196 of the flywheel 160.

The rim 176 and the hub 162 are joined by intermediate wall member 190 at outer edge 194 and inner edge 192, respectively. The wheel 160 may be made of plastic by use of a mold.

Figure 7:
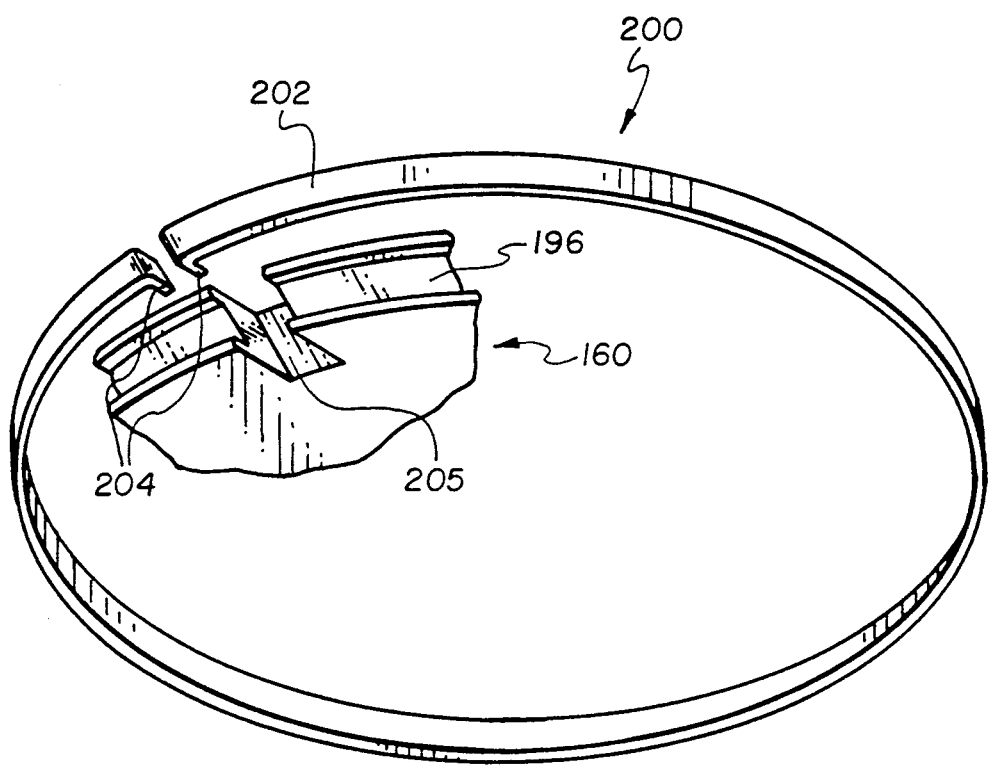
FIG. 7 is a perspective view of a band particularly adapted to the flywheel of FIG. 6.

FIG. 7 shows a band 200 particularly useful with a one-piece flywheel 160. The band 200 has a continuous smooth band surface 202 with ends 204 which are turned inwardly. Ends 204 are simply fitted into a slot 205 formed in the bed 196 and crimped to prevent outward radial movement of the band 205.

This invention permits the use of inexpensive readily available plastics for flywheel construction. Frictional heat is dissipated by a heat dissipating band. Band thickness and the material of construction may be varied to achieve a desired inertia. Additional mass may be added by inserting weights into or proximate the rim portion to enhance the wheel inertia when in operation.

Those skilled in the art will appreciate that modifications may be made to the illustrated embodiments without departing from the spirit thereof. It is not intended that the scope of the invention be limited to the specific embodiments illustrated and described. Rather, it is intended that the scope of the invention be determined by the scope of the appended claims.

What is claimed is:

1. A flywheel of the type used in exercise machines which employ an adjustable frictional resistance strap to provide a resistance to flywheel rotation through sliding frictional contact therewith, said flywheel comprising:

a central hub for rotatably mounting to a exercise machine;

an intermediate structure connected at a radially interior edge to said hub proximate an outer diameter thereof to extend radially away therefrom;

a rim secured about a radially outer edge of said intermediate structure and including a mass for substantially increasing the inertia of said flywheel;

a support surface about said perimeter;

said hub, said intermediate structure, and said rim comprising non-metallic plastic-like material; and a band formed of a heat dissipating material secured about said support surface, said band having an outer surface suitable for said sliding frictional contact with said adjustable frictional resistance strap.

2. The flywheel of claim 1, wherein said support surface is recessed in said rim.

3. The flywheel of claim 1, wherein the thickness of said band is dimensioned to provide a substantial part of said mass for substantially increasing the inertia of said flywheel.

4. The flywheel of claim 1, wherein said hub, said rim and said intermediate structure are formed of a moldable plastic-like material.

5. The flywheel of claim 4, wherein said intermediate structure, said central hub and said rim are one monolithic structure of a single moldable material.

6. The flywheel of claim 5, wherein said hub, said rim, said support surface and said intermediate structure comprise a single molded unit.

7. The flywheel of claim 4, wherein said plastic-like material is of the class of ABS, styrene, polyethylene, polypropylene and nylon.

8. The flywheel of claim 1, wherein said band is formed of metal or heat resistant non-metallic material.

9. The flywheel of claim 1, wherein said band comprises a structural member of a first material and is coated by an adhesive of a second material distinct from said first material and secured to the inside thereof for securing said band to said rim.

10. The flywheel of claim 1, further including weight material positioned within said rim to provide additional inertia to said flywheel.

11. The flywheel of claim 10, wherein said weight material is sand.

12. The flywheel of claim 1, wherein said band is formed in a plurality of substantially abutting arcuate segments.

13. The flywheel of claim 12, wherein each of said arcuate segments is secured to said support surface by an adhesive.

14. The flywheel of claim 1, wherein said band is formed to have a first end and a second end, each with a radially interiorally extending tab, and wherein said support surface has a slot formed therein to receive said tabs.

15. A flywheel of the type used in exercise machines which employ an adjustable frictional resistance strap to provide a resistance to flywheel rotation through sliding frictional contact therewith, said flywheel comprising:

a central hub for rotatably mounting to a said exercise machine;

an intermediate structure disposed about and connected to said hub and extending radially away therefrom;

a rim secured to said intermediate structure to form a perimeter of said flywheel;

a support surface about said perimeter;

said hub, said intermediate structure, and said rim comprising non-metallic plastic-like material;

a band formed of a heat dissipating material secured about said support surface, said band having an outer surface suitable for said sliding frictional contact with said adjustable frictional resistance strap; and circumferential slots in said rim adjacent said support surface for retaining said band thereon.

16. A flywheel of the type used in exercise machines which employ an adjustable frictional resistance strap to provide a resistance to flywheel rotation through sliding frictional contact therewith, said flywheel comprising:

a central hub for rotatably mounting to a said exercise machine;

an intermediate structure disposed about and connected to said hub and extending radially away therefrom;

a rim secured to said intermediate structure to form a perimeter and including a mass for substantially increasing the inertia of said flywheel;

a support surface about said perimeter;

said hub, said intermediate structure, and said rim comprising non-metallic plastic-like material;

a band formed of a heat dissipating material secured about said support surface, said band having an outer surface suitable for said sliding frictional contact with said adjustable frictional resistance strap; and said support surface means formed of two substantially symmetrical halves each having a hub structure and a side wall connected to and extending radially away from said hub structure and a rim structure connected to said side wall, said rim structure of one half and said rim structure of the other half together forming said rim; and means to secure one rim structure with the other rim structure.

17. A flywheel body for a stationary exercise cycle, said flywheel comprising:

a first body half including a first central hub structure, a first rim structure and a first wall structure radially joining said first hub structure to said first rim structure;

a second body half including a second central hub structure, a second rim structure and a second wall structure radially joining said second hub structure to said second rim structure;

wherein said first and second flywheel body halves are joined to form said flywheel body; and wherein said first and second rim structures each include a radially extending annular side member, an annular rib extending approximately transversely and inwardly from said side member toward said other body half, a band support member having a surface thereon and extending inwardly from said side member toward said other body half, said first and second surfaces forming a band support surface recessed from the radial periphery of said first and second annular side members, said side members each including a slot therein adjacent said band support surface for supporting and retaining a band disposed therein on said band support surface therein.

18. The flywheel body of claim 17, wherein each said body half is integrally formed of molded non-metallic plastic-like material.

19. The flywheel body of claim 18, further including a band of heat dissipating material fixedly mounted on said band support surface.

20. The flywheel body of claim 19, wherein said band is formed of a metal.

21. The flywheel body of claim 17, further including weight means disposed within said first and second rim structures between said band support members and said annular ribs to increase the inertia of said flywheel.

22. The flywheel body of claim 17, wherein said first and second body halves are mirror images of each other.

23. The flywheel body of claim 17, wherein the inner edges of said first and second band support members are rabbeted on the lower surface and upper surface respectively for fitting said inner edge of said second band support member within said inner edge of said first band support member.

24. A resistance system for an exercise machine comprising:

a frame;

a flywheel body rotatably mounted on said frame for rotation by a user, said flywheel being formed of a non-metallic plastic-like material and comprising:

a central hub for said rotatable mounting of said flywheel to said frame, support structure connected to said hub and extending radially away therefrom, a rim secured to said support structure to define a perimeter and including a mass for substantially increasing the inertia of said flywheel, a support surface disposed about the perimeter of said rim;

a band formed of a heat dissipating material secured about said support surface of said flywheel body, said band having an outer surface suitable for sliding frictional contact with a resistance strap of said exercise machine; and a resistance strap positioned about said flywheel body in contact with said band, said resistance strap having one end connected securely to said frame and another end adjustably connected to said frame for operation to vary the tension of said resistance strap and the sliding frictional force exerted thereby against said band.

* * * * *